UNITED STATES PATENT OFFICE.

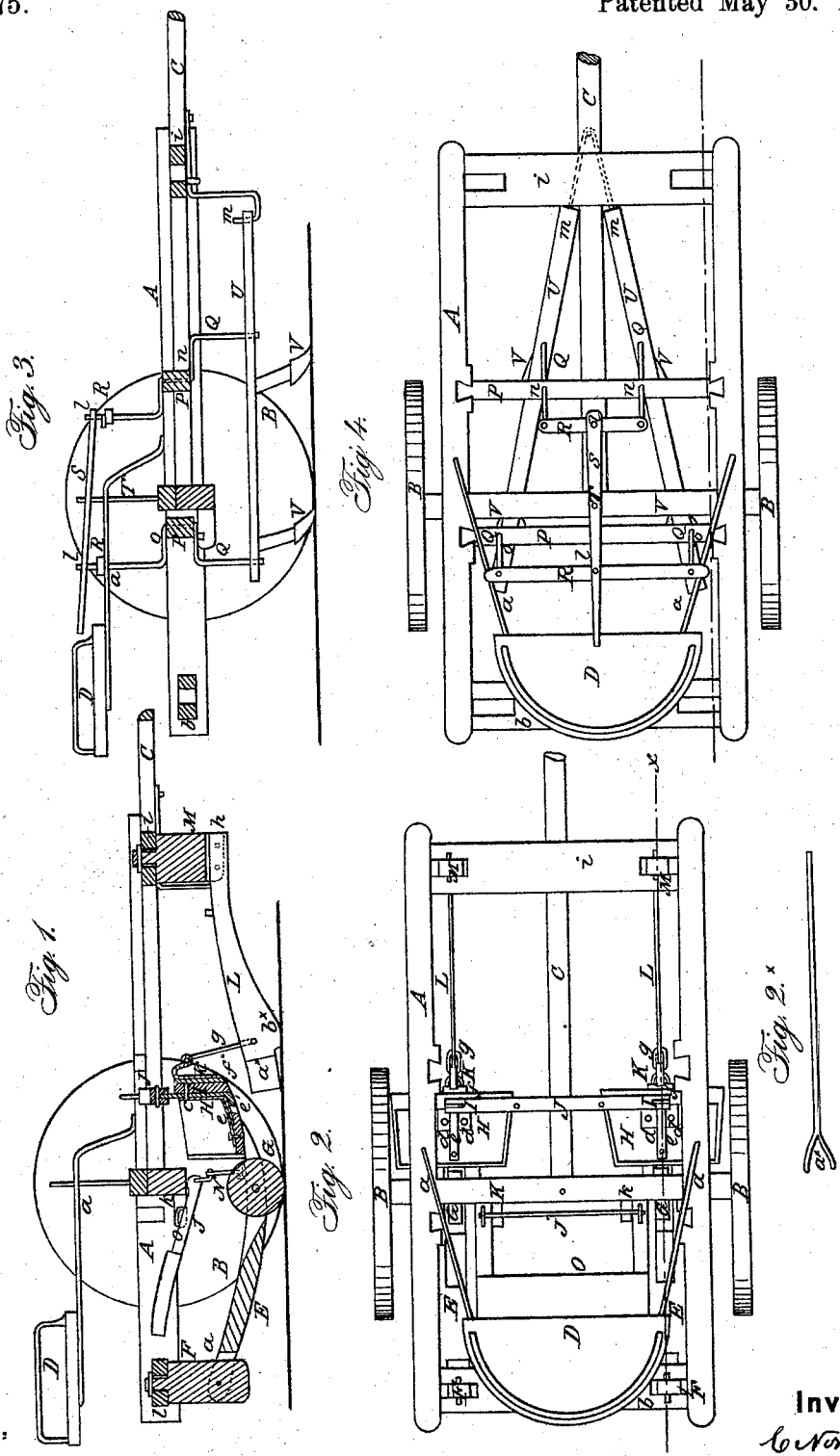

C. NORWOOD, OF BLOOMINGTON, ILLINOIS.

IMPROVEMENT IN COMBINED CULTIVATOR AND SEEDER.

Specification forming part of Letters Patent No. 47,975, dated May 30, 1865.

*To all whom it may concern:*

Be it known that I, C. NORWOOD, of Bloomington, in the county of McLean and State of Illinois, have invented a new and Improved Corn-Cultivator and Seeding-Machine; and I do hereby declare that the following is a full, clear, and exact description thereof, which will enable those skilled in the art to make and use the same, reference being had to the accompanying drawings, forming part of this specification, in which—

Figure 1, Sheet No. 1, is a side sectional view of my invention, taken in the line $x\,x$, Fig. 2; Fig. 2, a plan or top view of the same; Fig. $2^x$, a detached plan or top view of one of the furrow-openers; Fig. 3, Sheet No. 2, a side sectional view of Fig. 2, taken in the line $y\,y$, Fig. 4; Fig. 4, a plan or top view of the same.

Similar letters of reference indicate like parts.

This invention relates to a new and improved machine for planting and cultivating corn; and it consists in a peculiar construction and arrangement of parts, as hereinafter fully shown and described, whereby it is believed several advantages are obtained over the generality of machines now employed for that purpose.

A represents a rectangular frame, which is mounted on two wheels, B B.

C is the draft-pole, and D the driver's seat attached to rods or bars $a$, said seat being at the rear of the frame A.

E E represent two bars, the rear ends of which are connected by pivots $a$ to pendants F, which are secured to the back cross-bar, $b$, of the framing. In the front parts of these bars E E rollers G are inserted, which serve to cover the seed and press down the earth upon the same; and to the front end of each bar E there is attached a seed-box, H, to the front sides of which bars I are attached by pins $c$. The lower parts of the bars I are bent at right angles to the upper parts, and said lower parts extend over the bottoms of the seed-boxes, and they are each perforated with two holes, $d\,d$, said lower parts working under a "strike" or cut-off, $e$, in the seed-boxes. The upper ends of the bars I are connected by a cross-bar, J.

At the front end of each seed-box H there is a metal bar, K. These bars K are fitted in guides $f\,f$, so that they may rise and fall, and they are curved at their upper ends, and are connected by links $g$ to the inner ends of bars L L, the outer ends of which are attached by pins $h$ to pendants M, secured to the front cross-bar, $i$, of the framing. The rear parts of the bars L L are divaricated or forked, as shown clearly in Fig. $2^x$, at $a^x$, and just in front of the forked ends $a^x$ of the bars L there are colter-shaped projections $b^x$. (See Fig. 1.) The bars L L form the furrows as the machine is drawn along, and the seed is dropped from the boxes H by working the bar J laterally, the bars I being thereby oscillated on their pivots or pins $c$, and the seed distributed by the perforated lower parts of said bars as the holes $d$ pass underneath the strikes or cut-offs $e$ and come in line with a hole, $e^x$, in the bottom of each seed-box. The bar J may be operated by a lever or directly by hand.

The bars E E, just back of the seed-boxes H, are connected by links N with the front part of a lever-frame, O, the fulcrum-rod $j$ of which rests upon bearings $k$ at the rear of the axle of wheels B B. By depressing the back part of the frame O, which is done by the feet of the driver, the bars E E, and consequently the bars L L, will be raised, and the latter kept above the surface of the ground, which is necessary in turning the machine or in moving it from place to place. By this arrangement the seed will also be planted at a uniform depth, the furrow-openers being allowed to rise and fall to suit the undulations of the ground over which they may pass. The draft of the machine is also light, and the horses' necks are not subjected to any undue weight or pressure.

When the machine is used as a cultivator or corn-plow the seed-dropping mechanism is detached from the frame A, and two cross-bars, P P', are inserted transversely in the frame A, each having two crank-rods, Q Q, passing through them. The upper ends of the crank-rods of each bar P P' are connected by a bar, R, and these bars R R are each provided centrally with an upright pivot, $l$, which passes through a lever, S, the latter being fitted in an upright fulcrum-rod, T. (See Figs. 3 and 4.)

U U are two bars, the front ends of which are fitted on vertical rods $m\,m$ at the under side of the front part of the frame A, and the lower ends of the crank-rods Q Q pass through oblong slots in the bars U. The front crank-rods Q have their cranks $n$ of double form, while those, $o$, of the rear rods Q are of single form, and, as the fulcrum-rod T of the lever S is between the two pairs of crank-rods, it will be seen that as said lever is operated the bars U U will be moved simultaneously either to the right or left, and the plows V, which are attached to the bars U, made to conform to the sinuosities of the rows of plants.

I claim as new and desire to secure by Letters Patent—

1. The bars E E, provided with the seed-boxes H H and rollers G, and pivoted at their rear ends to pendants F at the back part of the framing A, in connection with the bars L L, pivoted at their front ends to the pendants M at the front part of the framing A, and provided at their rear ends with the colter projections $b^\times$ and the forks $a^\times$, and connected to the seed-boxes H by the links $g$, all arranged substantially as and for the purpose herein set forth.

2. The arrangement of the bent pivoted bars I I, seed-boxes H H, and connecting-bar J, substantially as and for the purpose herein specified.

C. NORWOOD.

Witnesses:
WM. M. RICHARDSON,
H. W. GARNETT.